(12) United States Patent
Sundaresan et al.

(10) Patent No.: US 11,706,268 B2
(45) Date of Patent: Jul. 18, 2023

(54) SOCIAL SHARING SYSTEM

(71) Applicant: PayPal, Inc., San Jose, CA (US)

(72) Inventors: Neelakantan Sundaresan, Mountain View, CA (US); Atish Das Sarma, Mountain View, CA (US); Si Si, Austin, TX (US); Elizabeth Churchill, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/931,279

(22) Filed: Sep. 12, 2022

(65) Prior Publication Data

US 2023/0073633 A1    Mar. 9, 2023

Related U.S. Application Data

(63) Continuation of application No. 16/983,846, filed on Aug. 3, 2020, now Pat. No. 11,444,991, which is a continuation of application No. 16/286,501, filed on Feb. 26, 2019, now Pat. No. 10,735,482, which is a continuation of application No. 13/945,772, filed on Jul. 18, 2013, now Pat. No. 10,218,751.

(60) Provisional application No. 61/680,646, filed on Aug. 7, 2012.

(51) Int. Cl.
*H04L 65/403* (2022.01)
*G06Q 50/00* (2012.01)
*G06Q 30/0251* (2023.01)

(52) U.S. Cl.
CPC ........ *H04L 65/403* (2013.01); *G06Q 50/01* (2013.01); *G06Q 30/0255* (2013.01); *G06Q 30/0271* (2013.01)

(58) Field of Classification Search
CPC .. H04L 65/403; G06Q 50/01; G06Q 30/0255; G06Q 30/0271
See application file for complete search history.

(56) References Cited

U.S. PATENT DOCUMENTS

| | | | |
|---|---|---|---|
| 7,720,722 B2* | 5/2010 | Ho | H04L 65/403 705/26.8 |
| 8,091,032 B2* | 1/2012 | Fischer | H04L 51/52 709/204 |
| 8,095,432 B1* | 1/2012 | Berman | G06Q 10/10 705/26.7 |
| 8,386,329 B1* | 2/2013 | Baughman | G06Q 30/0282 705/26.1 |
| 8,468,164 B1* | 6/2013 | Paleja | H04L 67/1097 708/805 |

(Continued)

OTHER PUBLICATIONS

Entire Prosecution History of U.S. Appl. No. 13/945,772, titled Social Sharing System, filed Jul. 18, 2013.

*Primary Examiner* — Jimmy H Tran
(74) *Attorney, Agent, or Firm* — Kowert, Hood, Munyon, Rankin & Goetzel, P.C; Mark D. Seegers; Dean M. Munyon

(57) ABSTRACT

A system, computer-readable storage medium storing at least one program, and computer-implemented method for providing recommendations based on social network sharing activity. Sharing activity relating to the sharing of the content item on a social network by a first user is accessed. Consumption information related to the consumption of the content item. A correlation between the sharing activity and the consumption information is determined. A recommendation is then generated based on the correlation.

20 Claims, 7 Drawing Sheets

(56) References Cited

U.S. PATENT DOCUMENTS

| | | | | |
|---|---|---|---|---|
| 8,688,712 B1* | 4/2014 | Klara | | G06F 16/41 |
| | | | | 707/748 |
| 8,738,468 B2* | 5/2014 | Lifson | | G06Q 30/0641 |
| | | | | 705/26.7 |
| 8,775,323 B2* | 7/2014 | Lee | | G06Q 30/0255 |
| | | | | 705/7.33 |
| 8,914,399 B1* | 12/2014 | Paleja | | G06Q 30/0635 |
| | | | | 709/227 |
| 9,129,324 B2* | 9/2015 | Shimogori | | G06Q 30/0609 |
| 9,524,487 B1* | 12/2016 | Yagnik | | G06Q 30/00 |
| 9,641,574 B1* | 5/2017 | Lewis | | H04L 65/403 |
| 9,824,406 B1* | 11/2017 | Curtis | | G06F 16/24 |
| 10,068,257 B1* | 9/2018 | Mosthaf | | G06Q 30/0203 |
| 10,096,033 B2* | 10/2018 | Heath | | G06Q 30/02 |
| 10,218,751 B2 | 2/2019 | Sundaresan et al. | | |
| 10,402,457 B1* | 9/2019 | Lawrence | | G06F 16/951 |
| 11,074,636 B1* | 7/2021 | Vora | | G06Q 30/0255 |
| 2006/0271460 A1* | 11/2006 | Hanif | | G06Q 30/04 |
| | | | | 705/40 |
| 2007/0143128 A1* | 6/2007 | Tokarev | | G06Q 30/0282 |
| | | | | 705/347 |
| 2007/0208729 A1* | 9/2007 | Martino | | G06F 16/9535 |
| | | | | 707/999.005 |
| 2008/0134053 A1* | 6/2008 | Fischer | | G06F 16/9535 |
| | | | | 715/747 |
| 2008/0154915 A1* | 6/2008 | Flake | | G06Q 30/02 |
| 2009/0006373 A1* | 1/2009 | Chakrabarti | | G06F 16/335 |
| | | | | 707/999.005 |
| 2009/0055291 A1* | 2/2009 | Ho | | H04L 65/403 |
| | | | | 705/26.8 |
| 2009/0132366 A1* | 5/2009 | Lam | | G06Q 30/0273 |
| | | | | 705/14.69 |
| 2009/0163183 A1* | 6/2009 | O'Donoghue | | G06Q 30/02 |
| | | | | 455/414.1 |
| 2009/0182642 A1* | 7/2009 | Sundaresan | | G06Q 30/0281 |
| | | | | 705/26.1 |
| 2009/0210246 A1* | 8/2009 | Patel | | G06Q 50/01 |
| | | | | 705/319 |
| 2009/0271256 A1* | 10/2009 | Toebes | | G06Q 30/0255 |
| | | | | 705/14.54 |
| 2009/0300547 A1* | 12/2009 | Bates | | G06F 16/954 |
| | | | | 707/999.005 |
| 2009/0327308 A1* | 12/2009 | Carter | | G06Q 30/02 |
| 2010/0057858 A1* | 3/2010 | Shen | | H04W 4/21 |
| | | | | 709/206 |
| 2010/0063969 A1* | 3/2010 | Kasargod | | G06F 16/9535 |
| | | | | 707/E17.046 |
| 2010/0088148 A1* | 4/2010 | Presswala | | G06Q 30/02 |
| | | | | 705/14.1 |
| 2010/0153175 A1* | 6/2010 | Pearson | | G06Q 50/01 |
| | | | | 379/88.14 |
| 2010/0169340 A1* | 7/2010 | Kenedy | | G06F 16/951 |
| | | | | 707/758 |
| 2010/0198757 A1* | 8/2010 | Cheng | | G06Q 10/06 |
| | | | | 709/224 |
| 2010/0235848 A1* | 9/2010 | Lam | | G06Q 30/02 |
| | | | | 719/328 |
| 2010/0280902 A1* | 11/2010 | Pang | | G06Q 30/0241 |
| | | | | 705/14.54 |
| 2010/0312644 A1* | 12/2010 | Borgs | | G06Q 30/02 |
| | | | | 715/764 |
| 2011/0087534 A1* | 4/2011 | Strebinger | | G06Q 50/01 |
| | | | | 705/26.7 |
| 2011/0238608 A1* | 9/2011 | Sathish | | G06Q 30/0269 |
| | | | | 706/47 |
| 2011/0264557 A1* | 10/2011 | Ho | | G06Q 30/0633 |
| | | | | 705/26.1 |
| 2011/0270774 A1* | 11/2011 | Varshavsky | | H04L 63/126 |
| | | | | 705/347 |
| 2011/0302126 A1* | 12/2011 | Sekino | | G06N 20/00 |
| | | | | 706/52 |
| 2012/0109749 A1* | 5/2012 | Subramanian | | G06Q 30/0255 |
| | | | | 705/26.43 |
| 2012/0158455 A1* | 6/2012 | Pathak | | G06Q 50/01 |
| | | | | 705/7.29 |
| 2012/0166280 A1* | 6/2012 | Lee | | G06Q 30/0255 |
| | | | | 705/14.53 |
| 2012/0215597 A1* | 8/2012 | Ross | | G06Q 50/01 |
| | | | | 705/14.1 |
| 2012/0233191 A1* | 9/2012 | Ramanujam | | G06F 16/9535 |
| | | | | 707/E17.107 |
| 2012/0254246 A1* | 10/2012 | Kerger | | H04W 4/21 |
| | | | | 707/769 |
| 2012/0278127 A1* | 11/2012 | Kirakosyan | | G06Q 30/0631 |
| | | | | 705/26.7 |
| 2013/0013398 A1* | 1/2013 | Wei | | G06Q 30/00 |
| | | | | 705/14.49 |
| 2013/0066972 A1* | 3/2013 | McLeod | | G06Q 50/01 |
| | | | | 709/204 |
| 2013/0073473 A1* | 3/2013 | Heath | | G06Q 30/0241 |
| | | | | 705/319 |
| 2013/0080549 A1* | 3/2013 | Watanabe | | G06Q 50/01 |
| | | | | 709/206 |
| 2013/0081036 A1* | 3/2013 | Cohen | | G06Q 10/06 |
| | | | | 718/102 |
| 2013/0086159 A1* | 4/2013 | Gharachorloo | | G06Q 50/01 |
| | | | | 709/204 |
| 2013/0090998 A1* | 4/2013 | Shimogori | | G06Q 30/08 |
| | | | | 705/14.23 |
| 2013/0138531 A1* | 5/2013 | Baughman | | G06Q 30/0631 |
| | | | | 705/26.7 |
| 2013/0166653 A1* | 6/2013 | Sherrets | | H04L 67/22 |
| | | | | 709/204 |
| 2013/0212028 A1* | 8/2013 | Delhaes | | G06Q 30/0282 |
| | | | | 705/301 |
| 2013/0218687 A1* | 8/2013 | Sohangir | | G06F 16/9535 |
| | | | | 705/14.66 |
| 2013/0232200 A1* | 9/2013 | Knapp | | H04L 67/306 |
| | | | | 709/204 |
| 2013/0282817 A1* | 10/2013 | Montgomery | | H04L 67/535 |
| | | | | 709/204 |
| 2013/0297692 A1* | 11/2013 | Raji | | H04L 65/403 |
| | | | | 709/204 |
| 2013/0346172 A1* | 12/2013 | Wu | | G06Q 30/0214 |
| | | | | 705/14.16 |
| 2013/0346877 A1* | 12/2013 | Borovoy | | H04L 65/403 |
| | | | | 715/753 |
| 2014/0013353 A1* | 1/2014 | Mathur | | G06F 16/735 |
| | | | | 725/34 |
| 2014/0149510 A1 | 5/2014 | Sundaresan et al. | | |
| 2014/0222622 A1* | 8/2014 | Du | | G06F 16/9535 |
| | | | | 705/26.63 |
| 2014/0222705 A1* | 8/2014 | Aladdin | | G06Q 50/20 |
| | | | | 705/321 |
| 2014/0258026 A1* | 9/2014 | Lifson | | G06Q 30/0601 |
| | | | | 705/26.7 |
| 2014/0324624 A1* | 10/2014 | Ward | | H04W 4/021 |
| | | | | 705/26.7 |
| 2015/0026148 A1* | 1/2015 | Howes | | G06F 16/93 |
| | | | | 707/706 |
| 2015/0088877 A1* | 3/2015 | Ruffner | | G06F 16/93 |
| | | | | 707/732 |
| 2015/0127565 A1* | 5/2015 | Chevalier | | G06Q 50/01 |
| | | | | 705/319 |
| 2015/0156172 A1* | 6/2015 | Nandi | | H04L 63/0471 |
| | | | | 713/153 |
| 2015/0220555 A1* | 8/2015 | Wang | | G06F 16/9535 |
| | | | | 707/624 |
| 2015/0242652 A1* | 8/2015 | Ho | | G06Q 30/0631 |
| | | | | 726/21 |
| 2016/0110464 A1* | 4/2016 | Channell | | G06F 16/9024 |
| | | | | 707/722 |
| 2016/0155059 A1* | 6/2016 | Ruffner | | G06F 16/954 |
| | | | | 706/11 |
| 2016/0321258 A1* | 11/2016 | Brunn | | G06Q 50/01 |
| 2017/0337280 A1* | 11/2017 | Yankovich | | G06F 16/532 |
| 2018/0114280 A1* | 4/2018 | Lam | | G06F 3/0481 |

(56) References Cited

U.S. PATENT DOCUMENTS

| | | | |
|---|---|---|---|
| 2018/0365316 A1* | 12/2018 | Liang | G06F 16/3323 |
| 2019/0197034 A1* | 6/2019 | Garcia | G06Q 50/01 |
| 2019/0220916 A1* | 7/2019 | Levy | G06Q 30/0631 |
| 2021/0035190 A1* | 2/2021 | Sundaresan | G06Q 50/01 |
| 2021/0051038 A1* | 2/2021 | Lester | G06Q 30/0218 |
| 2021/0374769 A1* | 12/2021 | Sundaresan | G06Q 30/0631 |

* cited by examiner

SOCIAL SHARING SYSTEM

The present application is a continuation of U.S. application Ser. No. 16/983,846, filed Aug. 3, 2020 (now U.S. Pat. No. 11,444,991), which is a continuation of U.S. application Ser. No. 16/286,501, filed Feb. 26, 2019 (now U.S. Pat. No. 10,735,482), which is a continuation of U.S. application Ser. No. 13/945,772, filed on Jul. 18, 2013 (now U.S. Pat. No. 10,218,751), which claims priority to U.S. Provisional Appl No. 61/680,646, filed on Aug. 7, 2012; the disclosures of each of the above-referenced applications are incorporated by reference herein in their entireties.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright © 2013, eBay Incorporated. All Rights Reserved.

TECHNICAL FIELD

Example embodiments of the present application generally relate to networked shopping and, more particularly, to a system and method for providing recommendations.

BACKGROUND

Members of various social networks and other online services provide information about themselves to others online. Members of these social networks may post and share information to the public at large or only to other members that are allowed to view this information. This information may take the form of general information about the user, interests of the user, or information about various tasks and activities that the user engages in. Websites also often provide functionality that allow users the ability to quickly share content hosted by the website (e.g., articles, pictures, videos, info graphics, blog posts, items offered for sale, etc.) with a variety of different social networks.

BRIEF DESCRIPTION OF THE DRAWINGS

Some embodiments are illustrated by way of example and not limitation in the figures of the accompanying drawings.

DETAILED DESCRIPTION

Figure 1:
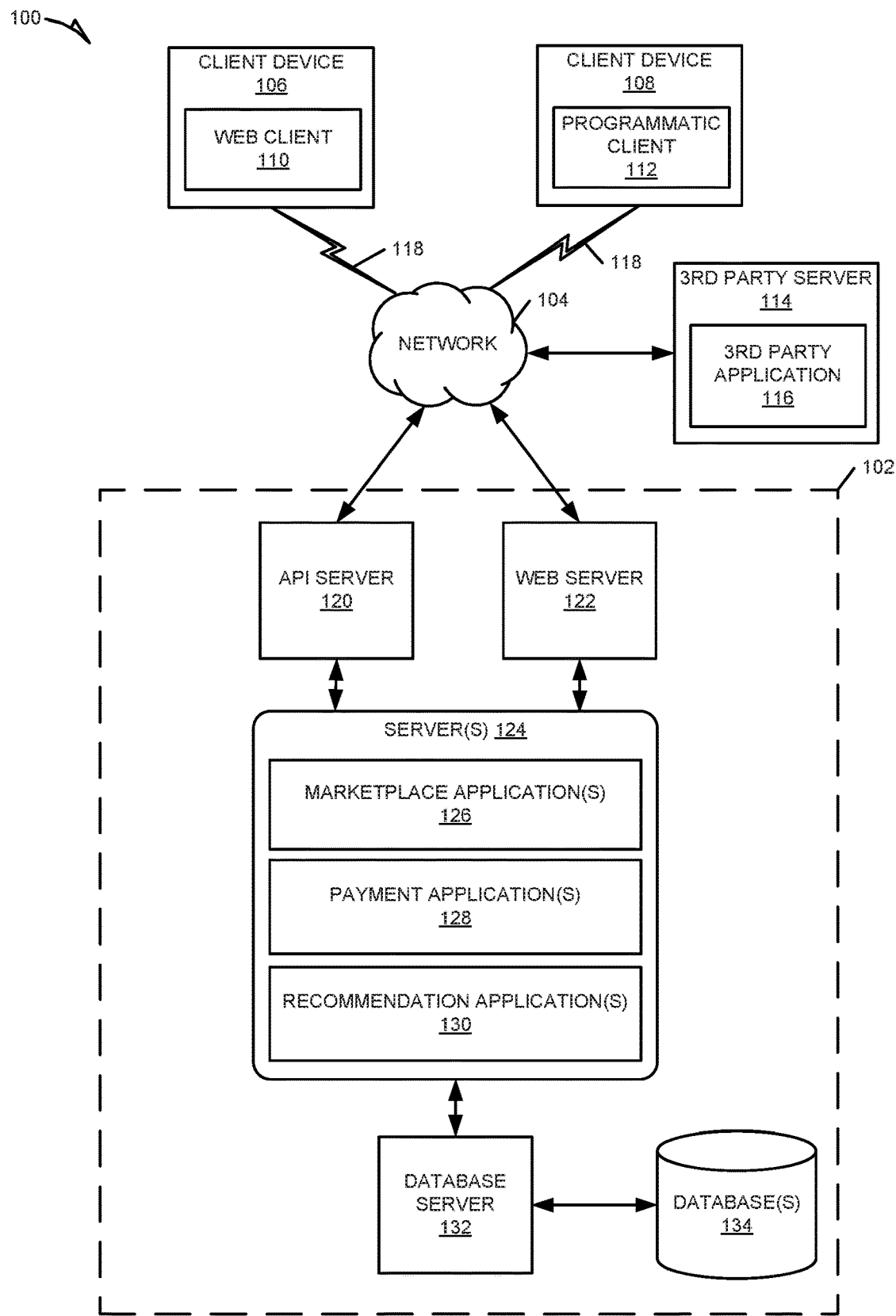
FIG. 1 is a network diagram depicting a network system having a client-server architecture configured for providing recommendations over a network, according to an example embodiment.

Reference will now be made in detail to specific example embodiments for carrying out the inventive subject matter. Examples of these specific embodiments are illustrated in the accompanying drawings. It will be understood that it is not intended to limit the scope of the claims to the described embodiments. On the contrary, it is intended to cover alternatives, modifications, and equivalents as may be included within the spirit and scope of the disclosure as defined by the appended claims. In the following description, specific details are set forth in order to provide a thorough understanding of the subject matter. Embodiments may be practiced without some or all of these specific details. In addition, well known features may not have been described in detail to avoid unnecessarily obscuring the subject matter.

In accordance with the present disclosure, components, process steps, and/or data structures may be implemented using various types of operating systems, programming languages, computing platforms, computer programs, and/or general purpose machines. In addition, those of ordinary skill in the art will recognize that devices of a less general purpose or nature, such as hardwired devices, field programmable gate arrays (FPGAs), application specific integrated circuits (ASICs), or the like, may also be used without departing from the scope and spirit of the concepts disclosed herein. Embodiments may also be tangibly embodied as a set of computer instructions stored on a computer readable medium, such as a memory device.

Aspects of the present disclosure describe systems and methods for providing recommendations based on social network sharing activity. Social network sharing activity refers to the posting and sharing of content items to social networks. Depending on the social network, a "share" may manifest itself in a number of different forms. For example, members of a social network may share content items in the form of a post, a status update, a tweet, a check-in, a pin, an electronic mail message, an instant message, or the like.

Consistent with some embodiments, the sharing activity may be compared to consumption information related to the corresponding items included in the sharing activity. Consumption information relates to the consumption of a particular content item. The way in which a content item is consumed may depend on the form or type of the content item being shared. For example, consumption of an image may simply comprise viewing the image. In another example, consumption of an item offered for sale may comprise adding the item to an electronic shopping cart and purchasing the item.

The sharing activity and consumption information may be analyzed to identify correlations between the sharing of a content item and the subsequent consumption of that item or similar item. The consumption of an item may involve consumption of the content item by the sharing user or by other members of the social network. The correlations may be used to generate recommendations. The recommendations may include the originally shared content item in addition to, or in the alternative to, one or more similar content items. In some embodiments, the recommendation is to purchase one or more items offered for sale on a network based marketplace.

The generated recommendations may be provided to a user in response to a request for such, or may be provided automatically to a user. Depending on the identified correlations, the recommendation may be provided to a user who initially shared a content item, one or more other users who are connected to the user, one or more users that are similar or related to the sharing user, or one or more users that share a similar relationship with connections of the sharing user.

FIG. 1 is a network diagram depicting an example network system 100, according to one embodiment, having a client-server architecture configured for exchanging data over a network. For example, the network system 100 may be a data exchange platform 102 where clients may communicate and exchange data within the network system 100. The data may pertain to various functions and aspects associated with the network system 100 and its users.

A data exchange platform 102 may provide server-side functionality, via a network 104 (e.g., the Internet), to one or more client devices. The one or more client devices may be operated by users that use the network system 100 and more specifically, the data exchange platform 102, to exchange data over the network 104. These transactions may include transmitting, receiving (communicating), and processing data to, from, and regarding content and users of the network system 100. The data may include, but are not limited to, user preferences; social network activity; demographic user data; product and service feedback, advice, and reviews; product, service, manufacture, and vendor recommendations and identifiers; product and service listings associated with buyers and sellers; product and service advertisements; auction bids; transaction data; and other data.

In various embodiments, the data exchanges within the network system 100 may be dependent upon user-selected functions available through one or more client or user interfaces (UIs). The UIs may be associated with a client device, such as a client device 106 using web client 110. The web client 110 may be in communication with the data exchange platform 102 via a web server 122. The UIs may also be associated with a client device 108 using a programmatic client 112, such as a client application, or a third party server 114 (e.g., one or more servers or client devices) hosting a third party application 116. It can be appreciated that, in various embodiments, the client device 106, 108, and/or the third party server 114 may be associated with a buyer, a seller, a third party electronic commerce platform, a payment service provider, or a shipping service provider, each in communication with the data exchange platform 102 and optionally each other. The buyers and sellers may be any one of individuals, merchants, or service providers, among other things.

The client devices 106 and 108 may be any of a variety of types of devices (e.g., a cellular telephone, a personal digital assistant (PDA), a personal navigation device (PND), a handheld computer, a tablet computer, a desktop computer, a notebook computer, a wearable computing device, or other type of movable device). The client devices 106 and 108 may interface via a connection 118 with a communication network 104 (e.g., the Internet or WAN). Depending on the form of the client device 106 and 108, any of a variety of types of connections 118 and communication networks 104 may be used.

For example, the connection 118 may be Code Division Multiple Access (CDMA) connection, a Global System for Mobile communications (GSM) connection, or other type of cellular connection. Such connection 118 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a wide area network (WAN), the Internet, or other packet-switched data network.

In yet another example, the connection 118 may be a wired connection, for example an Ethernet link, and the communication network 104 may be a LAN, a WAN, the Internet, or other packet-switched data network. Accordingly, a variety of different configurations are expressly contemplated.

Turning specifically to the data exchange platform 102, an application programming interface (API) server 120 and a web server 122 are coupled to, and provide programmatic and web interfaces respectively to, one or more application servers 124. The application servers 124 host one or more marketplace application(s) 126, payment application(s) 128, and recommendation application(s) 130. The application servers 124 may be coupled via these interfaces to the communication network 104, for example, via wired or wireless interfaces. The application servers 124 are, in turn, shown to be coupled to one or more database server(s) 132 that facilitate access to one or more database(s) 134. In some examples, the application servers 124 can access the database(s) 134 directly without the need for a database server 132.

The marketplace applications 126 may provide a number of marketplace functions and services (e.g., listing, payments, etc.) to users that access the data exchange platform 102. The payment applications 128 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 126. For some example embodiments, payment applications 128 generally enable transfer of values (e.g., funds, reward points, etc.) from an account associated with one party to another account associated with another party.

The recommendation applications 130 may provide recommendation services and functions to users. In some embodiments, the recommendation applications 130 may receive requests for recommendations, and, in turn, provide a recommendation to the user based on correlations between social sharing activity and consumption information. In some embodiments, the social sharing activity is the social sharing activity of the user. In other embodiments, the social sharing activity is the social sharing activity of a least one other user, wherein the at least one other user is related to the user requesting the recommendation.

While the marketplace applications 126, payment applications 128, and recommendation applications 130 are shown in FIG. 1 to form part of the data exchange platform 102, it will be appreciated that in alternative embodiments, the recommendation application 130 may form part of a social networking service that is separate and distinct from the data exchange platform 102.

Database server 132 may facilitate access to one or more databases 134 and retrieve data for inclusion in the data exchange platform 102. The data may correspond to user data, social sharing data, transaction history, listings of products or related products offered for sale, feedback for products, and so forth. In some embodiments, the databases 134 may include databases both internal and external to the data exchange platform 102.

Further, while the system 100 shown in FIG. 1 employs a client-server architecture, the present invention is, of course, not limited to such an architecture, and could equally well find application in an event-driven, distributed, or peer-to-peer architecture system, for example. The various modules of the application servers 124 may also be implemented as standalone systems or software programs, which do not necessarily have networking capabilities.

FIG. 1 also illustrates a third party application 116 that may execute on a third party server 114 and may have programmatic access to the data exchange platform 102 via a programmatic interface provided by the API server 120. For example, the third party application 116 may use information retrieved from the data exchange platform 102 to support one or more features or functions on a website hosted by the third party. The third party website may, for example, provide one or more networking, marketplace, or payment functions that are supported by the relevant applications of the data exchange platform 102.

Figure 2:
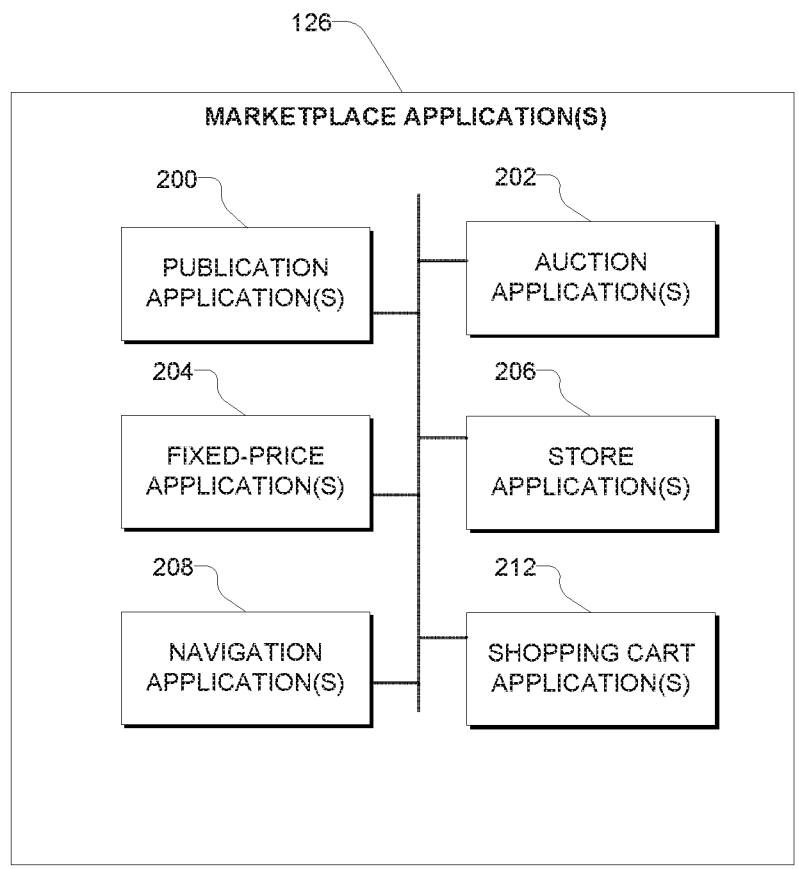
FIG. 2 is a block diagram illustrating an example embodiment of multiple marketplace applications, which are provided as part of the data exchange platform.

FIG. 2 is a block diagram illustrating an example embodiment of multiple marketplace applications 126, which are provided as part of the data exchange platform 102. The marketplace applications 126 may be hosted on dedicated or shared server machines (not shown) that are communicatively coupled to enable communications between server machines. Each of the marketplace applications 126, themselves, are communicatively coupled (e.g., via appropriate interfaces) to each other and to various data sources, so as to allow information to be passed between marketplace applications 126 or so as to allow the marketplace applications 126 to share and access common data. The marketplace applications 126 may furthermore access one or more databases 132 via the database servers 130.

The marketplace applications 126 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 126 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., a traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 may allow sellers to group their item listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the data exchange platform 102 may be facilitated by one or more navigation applications 208. For example, a search application may, inter alia, enable keyword searches of listings published via the marketplace 102. A browser application may allow users via an associated user interface to browse various category, catalogue, inventory, social network, and review data structures within the data exchange platform 102. Various other navigation applications (e.g., an external search engine) may be provided to supplement the search and browsing applications.

In one embodiment, electronic shopping cart application(s) 212 are used to create an electronic shopping cart used by users of the data exchange platform 102 to add and store items listed by the store application(s) 208. The electronic shopping cart applications 212 may also be used to "check out," meaning a user may purchase items in the electronic shopping cart. The electronic shopping cart applications 212 may facilitate the transactions by automatically finding the items in the electronic shopping cart across at least one or all of a predefined set of vendors, a comparison shopping site, an auction site, etc. In various embodiments, the selection criteria for which vendor or vendors to purchase from may include, but is not limited to, criteria such as lowest cost, fastest shipping time, preferred or highest rated vendors or sellers, or any combination thereof.

It will be appreciated that one or more the various example marketplace applications 126 and payment applications 128 may be combined into a single application. Further, in some embodiments, one or more applications may be omitted and additional applications may also be included. Additionally, while the applications of FIG. 2 are discussed in the plural sense, it is noted that a single version of the application may be utilized.

Figure 3:
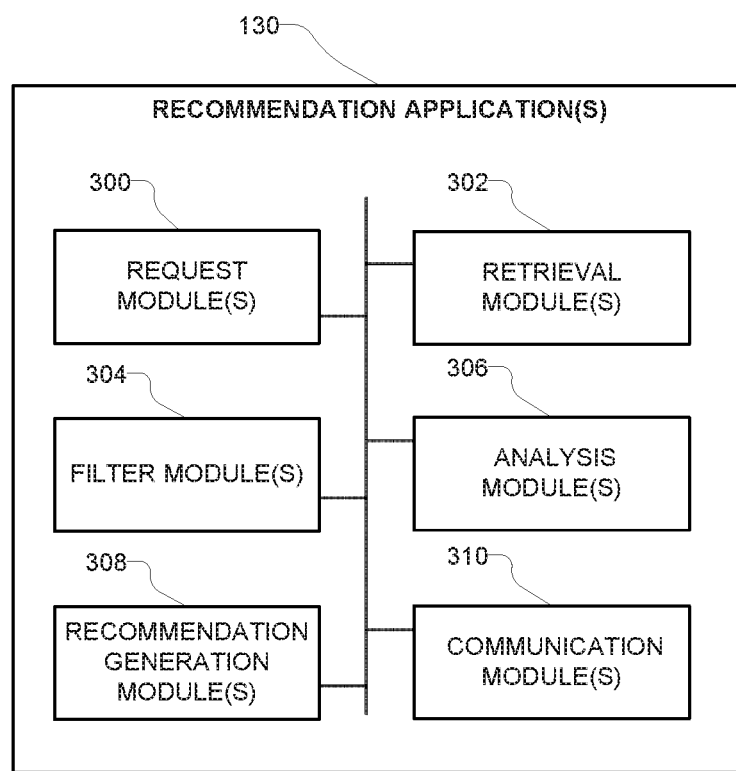
FIG. 3 is a block diagram illustrating an example embodiment of multiple recommendation applications, which are provided as part of the data exchange platform.

FIG. 3 is a block diagram illustrating an example embodiment of multiple modules forming the recommendation applications 130, which are provided as part of the data exchange platform 102. Each of the modules of the recommendation applications 130 may be hosted on dedicated or shared server machines (not shown) that are communicatively coupled to enable communications between server machines. Each of the modules of the recommendation applications 130, themselves, are communicatively coupled (e.g., via appropriate interfaces) to each other and to various data sources, so as to allow information to be passed between each of the modules and each recommendation applications 130 or so as to allow the modules of the recommendation applications 130 to share and access common data. The modules of the recommendation applications 130 may furthermore access one or more databases 134 via the database servers 132.

The recommendation applications 130 may provide a number of recommendation services to users. To this end, the recommendation applications 130 are illustrated to include one or more request modules 300 which may receive a request for a recommendation.

In some embodiments, the recommendation request may be a recommendation for an additional user. Consistent with this embodiment, the request may identify the additional user by name and, in some embodiments, may include an additional identifier of the additional user. The additional identifier may, for example, include an email address, a phone number, a username or a social network profile identifier. In some embodiments, the social network profile identifier may include a uniform resource locator (URL) corresponding to the social network profile of the additional user. In some embodiments, the social network profile identifier may be another type of unique identifier (e.g., a TWITTER "handle") that may assist the recommendation applications 130 in identifying the gift recipient or a social network profile belonging to the gift recipient.

The recommendation request may also include one or more recommendation criteria. The recommendation criteria may be used to narrow down the number of items or services returned as part of the recommendation. The recommendation criteria may, for example, include a price or price range, an expected delivery date or date range, a category of item or service, a clothing size, a shoe size, a parcel carrier preference, a gift occasion type, a relationship of the requesting user to the gift recipient or a location or region from which the item is to be shipped or service rendered.

In some embodiments, the request modules 300 may receive a recommendation request from a requesting user operating a client device (e.g., client 106) via a GUI. In some embodiments, the recommendation request may be received by the request module 300 from a third party server (e.g., third party server 114) as a part of a social networking service offered by the third party.

As illustrated in FIG. 3, the recommendation applications 130 may include one or more retrieval modules 302, which may retrieve user data corresponding to the requesting user from one or more social networks. The user data may include user profile attributes, social network connection information, social sharing activity, and consumption information corresponding to one or more users. The user profile attributes may be stored in a profile on a social network or on the data exchange platform. The user profile attributes may comprise demographic data describing one or more characteristics of a user. Demographic data may, for example, include gender, age, location information, employment history, education history, contact information, familial relations, or user interests.

Social network connection information relates to the connections of the user on a social network. For purposes of the present disclosure, a social network "connection", also referred to as being "connected" on a social network, may include both a bi-lateral agreement between members of the social network as well as situations in which there is only a unilateral acknowledgement of the "connection." In the bi-lateral agreement situation both members of the "connection" acknowledge the establishment of the connection (e.g., friends). Similarly, in the unilateral acknowledgement situation, a member may elect to "follow" or "watch" another member. In contrast to bi-lateral agreement, the concept of "following" another member typically is a unilateral operation because it may not require acknowledgement or approval by the member that is being followed.

Social network sharing activity (also referred to as simply as "sharing activity") refers to the ability of users of social networks to "share" preferences, activities, transactions, or other content from third party websites with connections on social networks. Websites often provide a social sharing feature in the form of a share widget for one or more content pages hosted by the website. For example, online retailers may provide a share widget on all item listing pages. These share widgets enable users to quickly share a particular item listing with one or more of the connections of the user on one or more social networks. In example embodiments, the share widget may allow users to share information via posts to a number of different social networking websites, email, or other content aggregating websites. The sharing activity may be comprised of a plurality "shares" from one or more users of one or more items. For example, the social sharing activity may include one or more shares of one or more desired items offered for sale on a network based marketplace, "liked" articles from blogs or news sites, favorite videos or images, or the like. The sharing activity information may also identify the particular social network used to share an item as well as an identification of one or more users to whom the item was shared.

Depending on the social network, the sharing of an item on the social network may, for example, manifest itself as an activity feed post, a wall post, a status update, a tweet, a pinup, a "like," or a check-in. For purposes of the present disclosure, a "check-in" refers to a service provided by a social network that allows users to "check-in" to a physical space and share their location with other users of the social network. In some embodiments, a user may check-in to a specific location by sending a text message to the relevant social network service. Consistent with some embodiments, users may check-in to a specific location by using a mobile application provided by the social network on a client device (e.g., client device 106). The social network mobile application may use the GPS functionality of the client device to find the current location of the user and allow the user to share this information with other users of the social network.

Consumption information relates to the consumption of a content item shared on a social network. The manner of consumption may vary depending on the type of content item shared and the social network on which it is shared. For example, consumption of an article may include reading the article. In another example, consumption of an item offered for sale may include adding the item to a shopping cart or purchasing the item. In yet another example, consumption of a video may include viewing the video.

In some embodiments, the consumption information may indicate that a user merely clicked on a link provided in the social network share. The consumption information may also include any follow up actions taken by the user after clicking on the link (e.g., additional page views, follow up queries, purchase of related items, etc.).

In some embodiments, consumption information may comprise a transaction history. Transaction history may include information related to transactions for items or services offered for sale by a network based marketplace. The transaction history information may, for example, include a description of an item or service purchased by the user, an identifier of the item or service, a category to which the item or service belongs, a purchase price, a quantity, or a number of bids.

In some embodiments, the retrieval module 302 may use information identifying an additional user included in the recommendation request in conjunction with a requesting user's login information to obtain user data of the additional user. Login information refers to credentials required to access the social network profile of the user. Login credentials may include a username, password, and in some embodiments, a PKI certificate. Consistent with this embodiment, the retrieval module 302 may use the login information of the user to obtain, via an API, user data of the additional user that has been made available to the user by virtue of the user being connected to the additional users on the social network.

As illustrated in FIG. 3, the recommendation applications 130 may include one or more filter modules 304, which may filter data (e.g., sharing activity and consumption information) used to make a recommendation. In some embodiments, the filter modules 304 may filter data used in making a recommendation based on a time, location, region, or category associated with the data. For example, the filter module 304 may filter data used in the recommendation so as to omit social sharing activity data that was collected before a certain time. In another example, the filter module 304 may filter user data used in making the recommendation so as to only include data related to a particular category of items (e.g., news articles).

In some embodiments, the filter module 304 may filter the user data based on criteria supplied by a user. For example, the filter module 304 may filter user data so that only user data collected during a particular time range specified by the user is used in determining the recommendation.

The filter modules 304 may also filter the items or services included in a recommendation based on the techniques described herein in reference to the filtering of data used in making a gift recommendation.

As illustrated in FIG. 3, the recommendation applications 130 may include one or more analysis modules 306, which may analyze the retrieved social sharing activity and consumption information to determine a correlation between the social sharing activity and the consumption information. For example, the analysis module 306 may identify a correlation between the content items that receive the most clicks and content items that are the most popular items with respect to the number of social network shares. In determining the correlation between the sharing activity and consumption information, the analysis module 306 may analyze and compare the distribution of data in terms of a total number of shares, average number of shares, shares over time, number of page views, number of clicks, and in some embodiments, the number of purchases or checkouts of a particular item. In some cases the analysis module 306 may identify a negative correlation between the sharing activity and the consumption information, while in other cases the analysis module 306 may determine a positive correlation between the sharing activity and the consumption information.

In some embodiments, the analysis module may determine that a correlation exists between the sharing of a particular content item by a user and the later consumption of that item or a related item by the user or by one or more social network connections of the user. To this end, the analysis module 306 may determine that the sharing of a particular item directly resulted in the consumption of that item, or in other embodiments, the consumption of a related item.

In some embodiments, the analysis module 306 may analyze the social sharing activity and consumption information in conjunction with demographic data to identify a correlation between the sharing and consumption among certain demographic groups. For example, the analysis module 306 may determine that a particular age demographic is more likely to purchase an item if that item was previously shared by a social network connection. The analysis module 306 may also identify a correlation between a category of items shared and a demographic of users that consume the particular category of items. For example, the analysis module 306 may determine that users between the ages of 18-25 most often consume shared items related to technology.

In some embodiments, the analysis module 306 may analyze the social sharing activity and consumption information to identify a correlation related to category information corresponding to the content items being shared and consumed. For example, the analysis module 306 may determine that video content belonging to the category of "comedy," when shared by one or more users, most often results in the consumption of the video. In another example, the analysis module 306 may determine that news articles belonging to the category of "politics," when shared by one or more users, most frequently does not result in consumption of the article.

In some embodiments, the analysis module 306 may analyze the social sharing activity and consumption information to identify a correlation between the social network used to share the item and the consumption of the item. For example, the analysis module 306 may determine that content items shared on Pinterest, as opposed to another social network, most often result in a purchase of those content items or related content items. In some embodiments, the correlation may also depend on a category of the item. For example, the analysis module 306 may determine that items related to technology shared on Facebook result in consumption of those items more often than other social networks.

In some embodiments, the analysis module 306 may also analyze profile attributes and social network connection information of a user to identify similarly situated users. Identifying similar users may comprise identifying one or more users sharing one or more profile attributes with a target user. The social sharing activity and consumption information of the similarly situated users are in turn analyzed by the analysis module 306 to determine correlations between the data according to methods described herein.

In some embodiments, the analysis module 306 may identify a correlation between the consumption of a particular item by a user and a relationship of that user with the social network connection that shared the item. For example, the analysis module 306 may determine that items shared between a father and a son most often result in consumption of those items. In another example, the analysis module 306 may determine that items shared between a mother and a son most often do not result in consumption of those items. To this end, the analysis module 306 may be configured to determine a set of attributes defining a relationship between two or more users who are involved with the sharing of a particular item. The relationship attributes may, for example, include a familial relationship, a romantic relationship status, a length of time the two users have known each other, a common employer, a common attendance of an educational institution, or the like. The analysis module 306 may then identify one or more additional users who also share a relationship defined by the one or more of the set of attributes.

In some embodiments, the analysis modules 306 may include the intelligence to learn from previous recommendations that were provided to previous users and resulted in the previous users purchasing items or services recommended therein. The analysis module 306 may determine that recommendations based on a sharing activity of a particular user or group of users most often results in consumption of the recommended item or service. In future recommendations, the analysis module 306 may again use the sharing activity of the particular user or group of users as a basis for a recommendation. To this end, the analysis module 306 may track and store transactions resulting from a previously supplied recommendation in a database (e.g., database 134) for later retrieval.

The recommendation generation module 308 may be configured to generate a recommendation based on a correlation between the social sharing activity and the consumption information. One of ordinary skill in the art would recognize that the correlations identified by the analysis module 306 may provide insights as to content that may be potentially desirable or valuable to users. The recommendation may, for example, include a recommendation to purchase an item or service offered for sale, read an book, article or blog post, watch a video or movie, listen to a song, view an image or other graphic content, or to use a particular online service.

In some embodiments, the recommendations may be based in part on a user's relationship with other users. For example, the analysis module 306 may determine that items shared between a father and a son most often result in consumption of those items. In this example, the generation recommendation module 308 may generate a recommendation for a particular user to purchase an item based on the particular user's father sharing the item description page on a social network.

Consistent with some embodiments, the recommendation generation module 308 may work in conjunction with the filter module 304 to narrow results provided in a recommendation to only those meeting recommendation criteria set forth in a recommendation request received by the request module 300.

As illustrated in FIG. 3, the recommendation applications 130 may include one or more communication modules 310, which may communicate the recommendations generated by the recommendation generation module 308 to the applicable requesting user or service.

In some embodiments, the communication module 310 may be used for generation and delivery of messages including the recommendation to users of the data exchange platform 102. Respective communication modules 310 may utilize any one of a number of message delivery networks and platforms to deliver messages to users. For example, the communication modules 310 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

Figure 4:
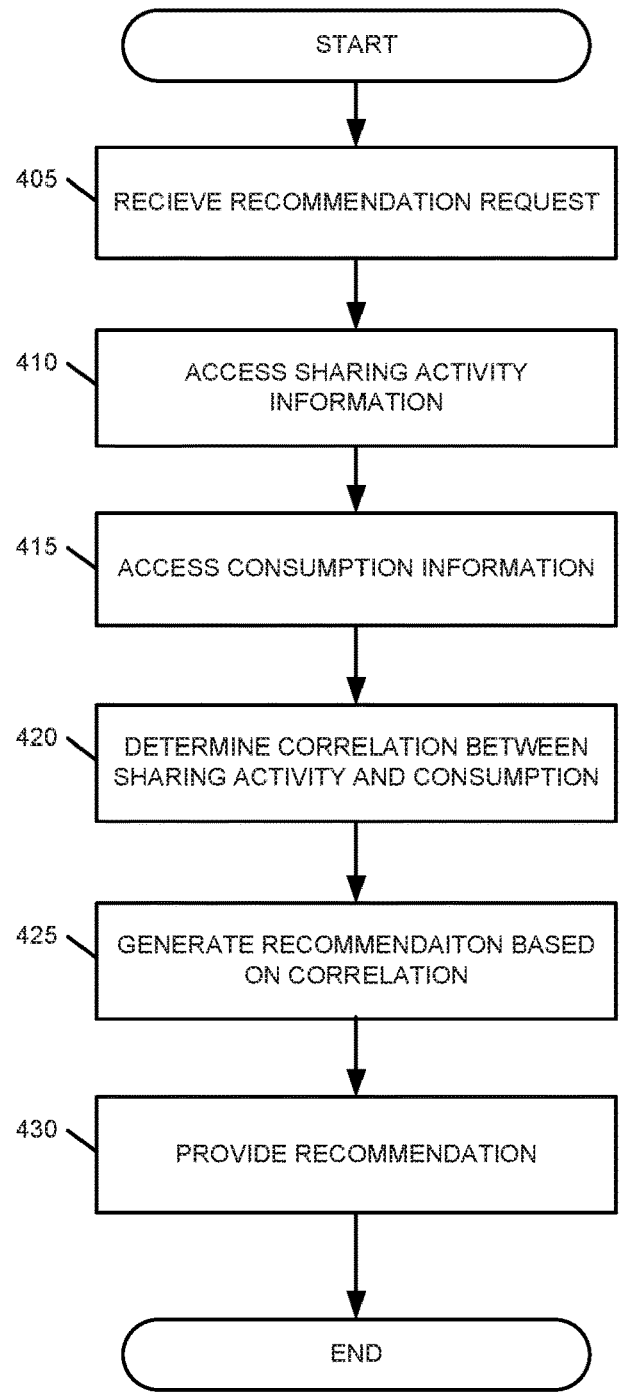
FIG. 4 is a flowchart illustrating an example method for providing a recommendation based on social sharing, according to an example embodiment.

FIG. 4 is a flowchart illustrating an example method 400 of providing a recommendation based on social sharing, according to an example embodiment. In this example, the method 400 may include operations such as receiving a recommendation request at operation 405, accessing sharing activity information at operation 410, accessing consumption information at operation 415, determining a correlation between sharing activity and consumption information at operation 420, generating a recommendation based on the correlation at operation 425, and providing the recommendation at operation 430.

At operation 405, the recommendation request is received. In some embodiments, the recommendation request may be received directly from a user via a user interface provided by the data exchange platform 102 or by a third party application or website (e.g., a social network service). The recommendation request may be for the requesting user or for a second user identified in the recommendation request. In other embodiments, the recommendation request may be received automatically, without action by a user, from the data exchange platform 102 or third party application or website.

At operation 410, sharing activity information related to the sharing of one or more content items on a social network is accessed. The sharing activity information may identify one or more social networks to which the one or more content items were shared as well as identify one or more user to whom the content item was shared. The sharing activity may correspond to a particular user or to a group of users. Consistent with some embodiments, the sharing activity may be based on information obtained from a user utilizing a social network sharing feature included in a web page hosted by the data exchange platform 102. In other embodiments, the sharing activity is obtained via API from one or more social networks.

At operation 415, consumption information related to the consumption of the one or more content items is accessed. The consumption information may include information related to the consumption of the content item by the user who shared the one or more content items. In addition or in the alternative, the consumption information may include information related to the consumption of the content item by the one or more users to whom the content was shared. In some embodiments, the consumption information may include a transaction history related to one or more items purchased from a network based marketplace.

At operation 420, the analysis module 308 may analyze the access sharing activity information and consumption information to identify a correlation between the two sets of information. In some embodiments, the determining of the correlation may comprise comparing a set of content items shared with a set of content items consumed to determine the intersection between the two sets of content items.

At operation 425, a recommendation is generated based on the correlation. The recommendation may include the one or more content items or at least one or more similar content items that are related to the one or more content items. Further details of operation 425, according to an example embodiment, are described below with respect to FIG. 5.

At operation 430, the recommendation is provided to one or more users. In some embodiments, providing the recommendation may comprise displaying the recommendation on an activity feed of one or more users, or in other embodiments, displaying the recommendation in one or more user interfaces of the data exchange platform.

Figure 5:
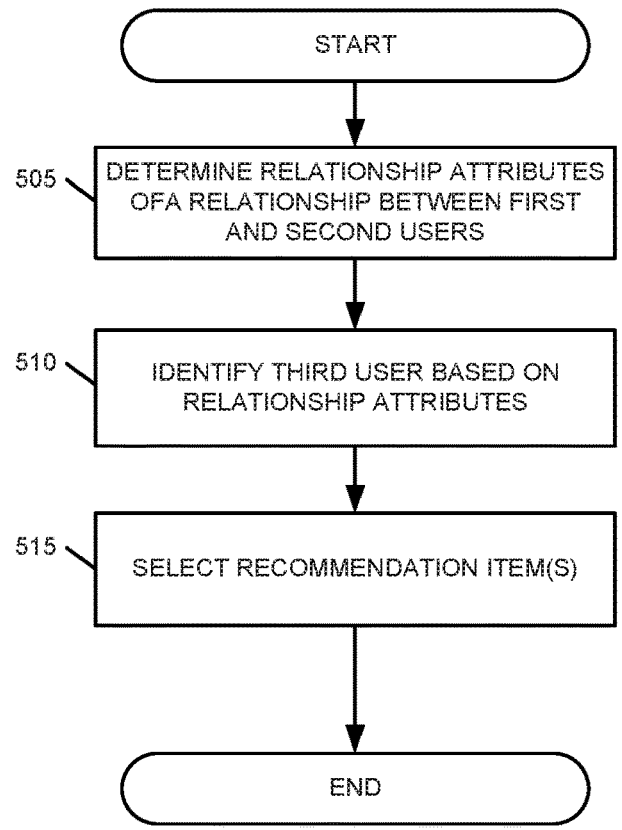
FIG. 5 is a flowchart illustrating an example method for providing a recommendation based on social sharing, according to an example embodiment.

FIG. 5 is a flowchart illustrating multiple operations comprising operation 425 of method 400, according to an example embodiment. In this example, the operation 425 may include operations such as determining relationship attributes of a first and second user at 505, identifying a third user at operation 510, and identifying a recommendation content item at operation 515.

At operation 505, one or more relationship attributes defining a relationship between the first user and the second user are determined. The first and second users may be connections on a social network. In some embodiments, the sharing activity accessed by the retrieval module 302 at operation 410 corresponds to the first user and the consumption information accessed at operation 415 corresponds to the second user. The relationship attributes may, for example, include a familial relationship, a romantic relationship status, a length of time the two users have known each other, a common employer, a common attendance of an educational institution, or the like.

At operation 510, a third user is identified based on the one or more relationship attributes. The third user may be a connection with the first user and may share the same relationship with the first user that exists between the first and second users, for example.

At operation 515, one or more recommended content items are selected based on the correlation determined at operation 420. The one or more recommended content items may in turn be used to generate a recommendation for the third user.

Example Client Device

Figure 6:
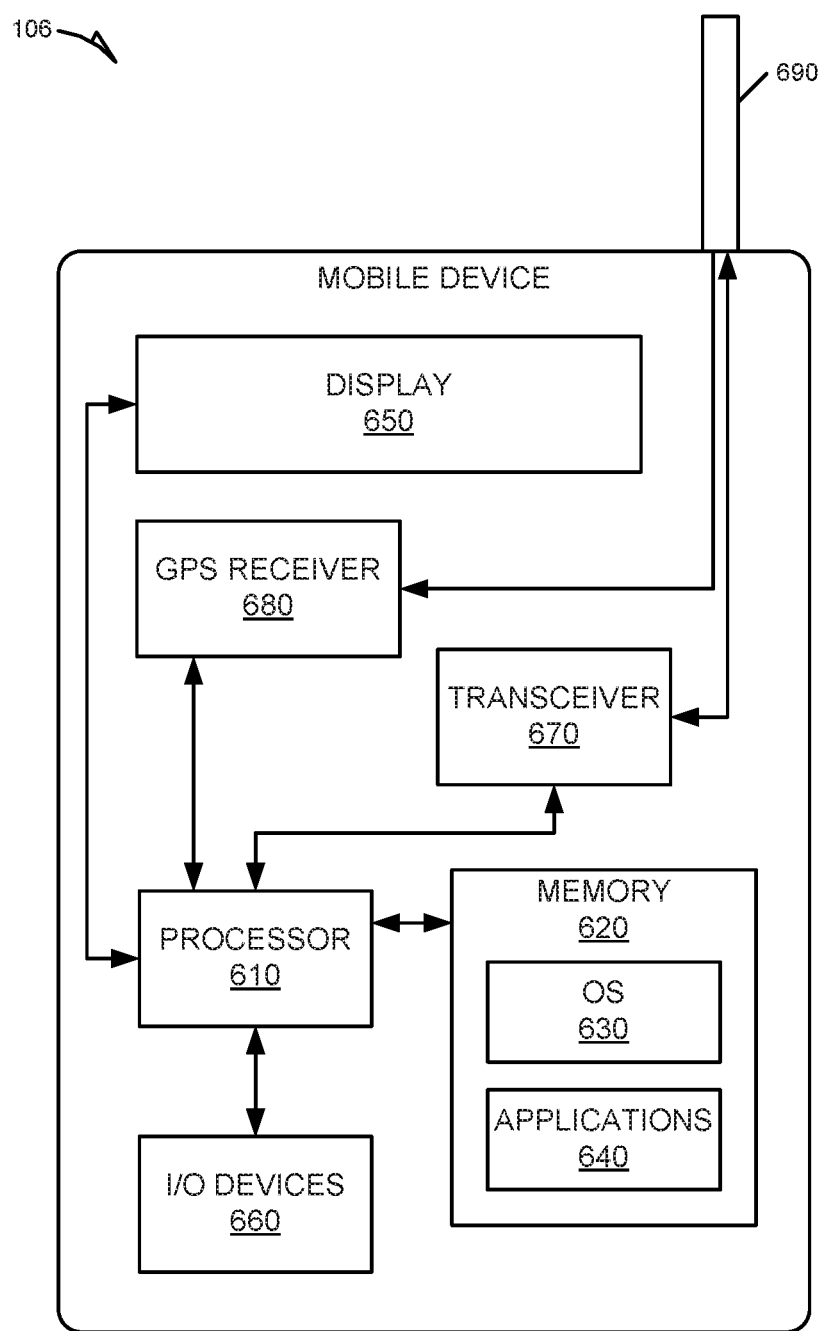
FIG. 6 is a block diagram illustrating a mobile device, according to an example embodiment.

FIG. 6 is a block diagram illustrating a client device 106, such as a mobile device, according to an example embodiment. The client device 106 may include a processor 610. The processor 610 may be any of a variety of different types of commercially available processors suitable for mobile devices (e.g., an XScale architecture microprocessor, a Microprocessor without Interlocked Pipeline Stages (MIPS) architecture processor, or another type of processor). A memory 620, such as a random access memory (RAM), a Flash memory, or other type of memory, is typically accessible to the processor 610. The memory 620 may be adapted to store an operating system (OS) 630, as well as application programs 640, such as a mobile location enabled application that may provide location based services (e.g., physical location check-in) to a user. The processor 610 may be coupled, either directly or via appropriate intermediary hardware, to a display 650 and to one or more input/output (I/O) devices 660, such as a keypad, a touch panel sensor, a microphone, and the like. Similarly, in some embodiments, the processor 610 may be coupled to a transceiver 670 that interfaces with an antenna 690. The transceiver 670 may be configured to both transmit and receive cellular network signals, wireless data signals, or other types of signals via the antenna 690, depending on the nature of the client device 106. In this manner, the connection 118 with the network 104 may be established. Further, in some configurations, a GPS receiver 680 may also make use of the antenna 690 to receive GPS signals.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
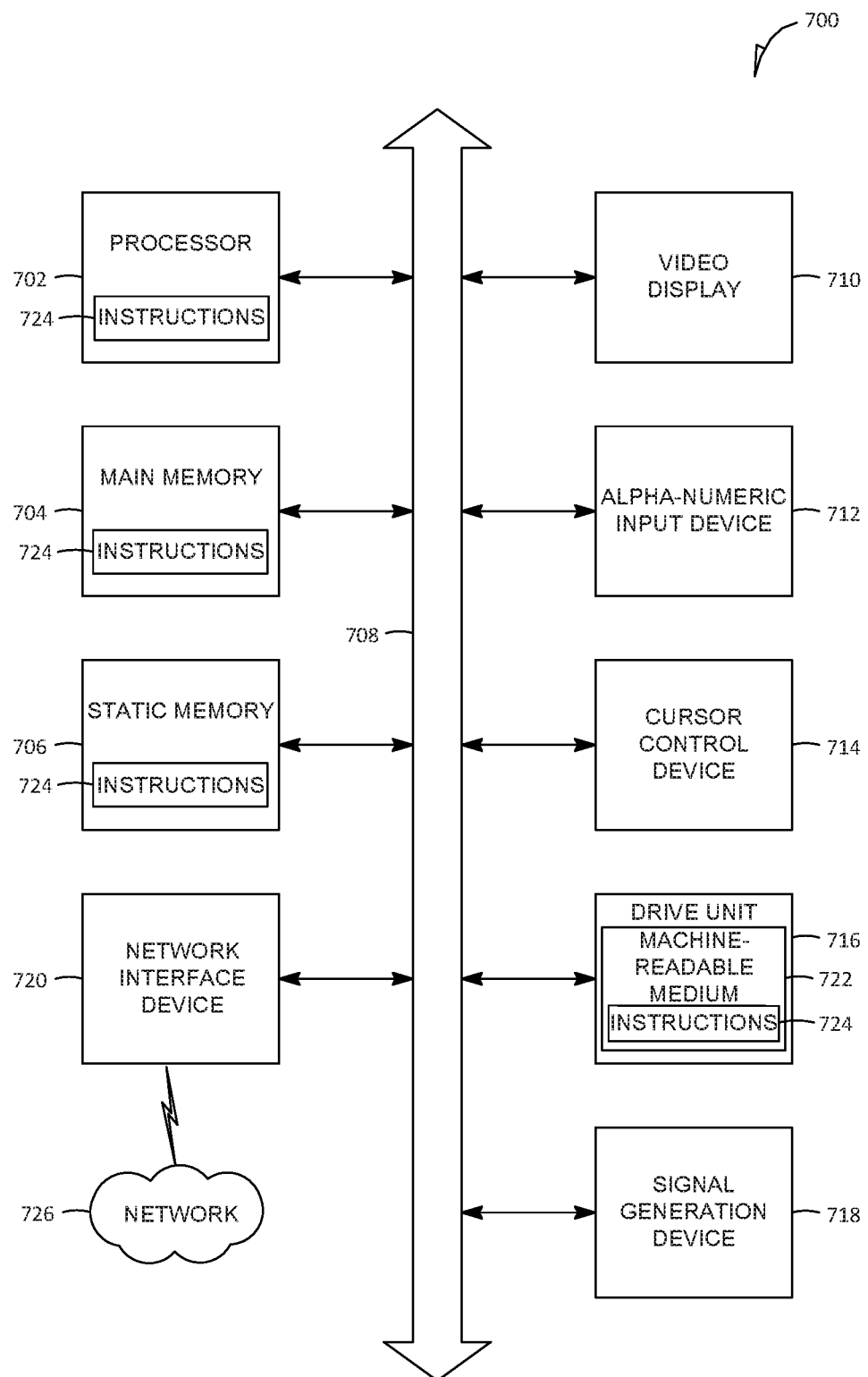
FIG. 7 is a diagrammatic representation of a machine in the example form of a computer system within which a set of instructions for causing the machine to perform any one or more of the methodologies discussed herein may be executed.

FIG. 7 is a block diagram of machine in the example form of a computer system 700 within which instructions 724 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a UI cursor control device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or used by any one or more of the methodologies or functions described herein. The instructions 724 may also reside, completely or at least partially, within the main memory 704, static memory 706, and/or within the processor 702 during execution thereof by the computer system 700, with the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more data structures or instructions 724. The term "machine-readable medium" shall also be taken to include any tangible medium or tangible device that is capable of storing, encoding, or carrying instructions for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, comprising:
   accessing, by a computer system, user data that includes:
      sharing activity information that identifies at least one instance of a first user sharing a news article on a set of social networks;
      consumption information that identifies at least a consumption of the news article by one or more other users that have connections with the first user on the set of social networks;
   determining, by the computer system, a set of correlations based on the sharing activity information and the consumption information;
   after determining the set of correlations, the computer system identifying a second user based on the set of correlations;
   determining, by the computer system, a particular news article for the second user based on the set of correlations; and
   causing, by the computer system, the particular news article to be presented to the second user via a user interface on a device associated with the second user.

2. The method of claim 1, wherein the determining of the set of correlations includes:
   determining, by the computer system, a correlation between the consumption of the news article and a category of the news article.

3. The method of claim 2, wherein the correlation is a negative correlation between the category of the news article and consumption of news articles of the category.

4. The method of claim 1, wherein the determining of the set of correlations includes:
   determining, by the computer system, a correlation between the consumption of the news article and a given one of the set of social networks on which the news article was shared.

5. The method of claim 1, wherein the determining of the set of correlations includes:
   determining, by the computer system, a correlation between the consumption of the news article and a type of relationship between the first user and a particular one of the one or more other users that have connections with the first user.

6. The method of claim 1, further comprising:
   filtering, by the computer system, the user data to produce a filtered subset of data that relates only to news articles, wherein the determining of the set of correlations is based on the filtered subset of data and not an entirety of the user data.

7. The method of claim 1, wherein the user data is accessed using a set of application programming interfaces (APIs) associated with the set of social networks.

8. The method of claim 1, wherein the causing of the particular news article to be presented to the second user is performed automatically and not in response to a request from the second user for a news article recommendation.

9. A non-transitory computer-readable medium having program instructions stored thereon that are executable by a computer system to perform operations comprising:

accessing sharing activity information that identifies an instance of a first user sharing a news item on a set of social networks;

accessing consumption information that identifies a consumption of the news item by a second user that has a connection with the first user on the set of social networks;

determining a set of correlations based on the sharing activity information and the consumption information;

identifying a third user based on the set of correlations;

determining, based on the set of correlations, a particular news item to present to the third user as a recommendation for the third user; and causing the particular news item to be presented to the third user.

10. The medium of claim 9, wherein the determining of the set of correlations includes:

determining a correlation between the consumption of the news item and a type of relationship between the first user and the second user.

11. The medium of claim 9, wherein the determining of the set of correlations includes:

determining a correlation between the consumption of the news item and a given one of the set of social networks on which the news item was shared.

12. The medium of claim 9, wherein the operations further comprise:

filtering the sharing activity information and the consumption information to produce a filtered subset of information that includes only information associated with a particular time frame, wherein the determining of the set of correlations is based on the filtered subset of information and not an entirety of the sharing activity information and the consumption information.

13. The medium of claim 9, wherein the operations further comprise:

accessing connection information that identifies a set of users having a connection with the first user, wherein the third user is identified from the set of users.

14. The medium of claim 9, wherein the operations further comprises causing the news item to also be presented to the third user.

15. A system, comprising:

at least one processor; and a memory having program instructions stored thereon that are executable by the at least one processor to cause the system to perform operations comprising:

accessing user data that includes:

sharing activity information that identifies at least one instance of a first user sharing article content on a set of social networks;

consumption information that identifies at least a consumption of the article content by one or more other users that have connections with the first user on the set of social networks;

determining a set of correlations based on the sharing activity information and the consumption information;

after determining the set of correlations, identifying a second user based on the set of correlations; and causing the article content to be presented to the second user as a recommendation.

16. The system of claim 15, wherein the determining of the set of correlations includes:

determining a correlation between the consumption of the article content and a type of relationship between the first user and a particular one of the one or more other users.

17. The system of claim 15, wherein the determining of the set of correlations includes:

determining a correlation between the consumption of the article content and a category of the article content.

18. The system of claim 15, wherein the second user has a connection with the first user on at least one of the set of social networks.

19. The system of claim 15, wherein the operations further comprise:

filtering the user data based on a set of criteria to produce a filtered subset of data, wherein the determining of the set of correlations is based on the filtered subset of data and not an entirety of the user data.

20. The system of claim 15, wherein the causing of the article content to be presented to the second user is performed automatically without receiving a request from the second user for an article content recommendation.

* * * * *